June 9, 1931.  G. W. ESCHENBACH  1,809,376

INTERCHANGEABLE BLOCK BILLBOARD

Filed Aug. 22, 1929   5 Sheets-Sheet 1

Inventor.
Gustavus W. Eschenbach.
by
Lockwood & Lockwood,
His Attorneys.

June 9, 1931. G. W. ESCHENBACH 1,809,378
INTERCHANGEABLE BLOCK BILLBOARD
Filed Aug. 22, 1929   5 Sheets-Sheet 2

Inventor.
Gustavus W. Eschenbach
by
Lockwood & Lockwood,
His Attorneys.

June 9, 1931.  G. W. ESCHENBACH  1,809,378
INTERCHANGEABLE BLOCK BILLBOARD
Filed Aug. 22, 1929   5 Sheets-Sheet 3

Inventor.
Gustavus W. Eschenbach.
by
Lockwood & Lockwood,
His Attorneys.

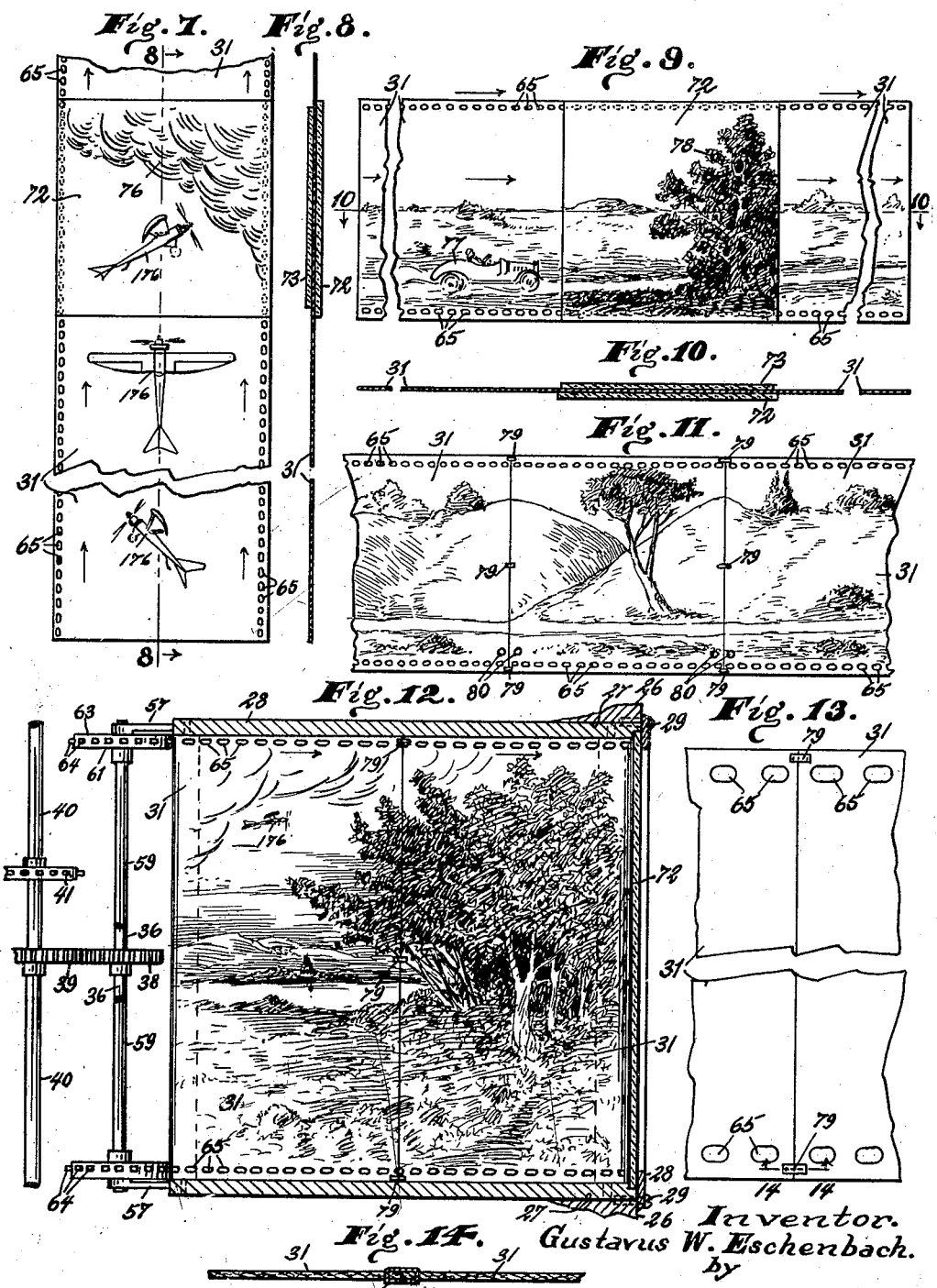

June 9, 1931.   G. W. ESCHENBACH   1,809,378
INTERCHANGEABLE BLOCK BILLBOARD
Filed Aug. 22, 1929    5 Sheets-Sheet 5
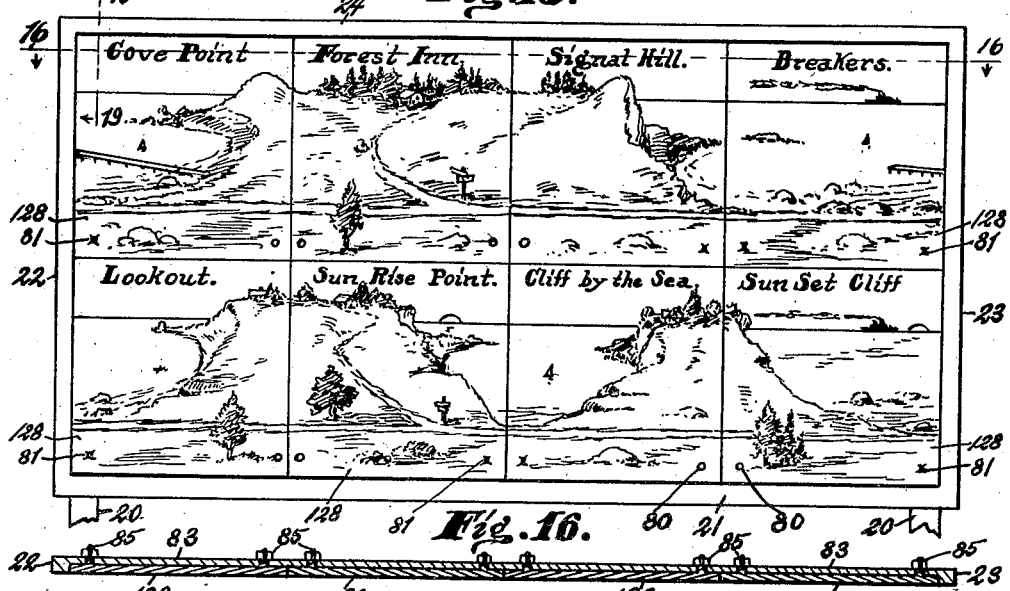
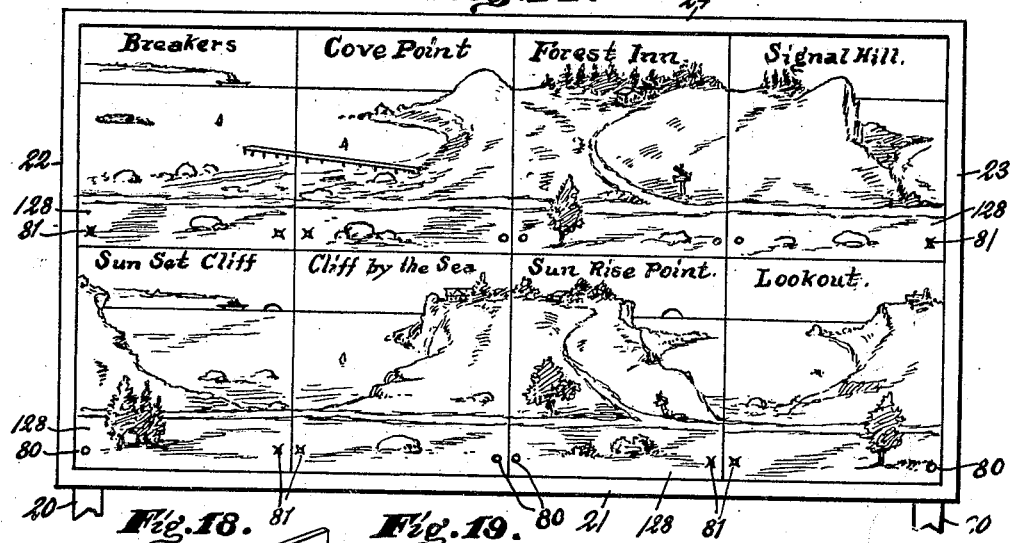
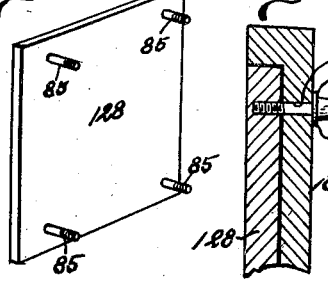
Inventor.
Gustavus W. Eschenbach.
by
Lockwood & Lockwood,
His Attorneys.

Patented June 9, 1931

1,809,378

UNITED STATES PATENT OFFICE

GUSTAVUS W. ESCHENBACH, OF LOS ANGELES, CALIFORNIA

INTERCHANGEABLE BLOCK BILLBOARD

Application filed August 22, 1929. Serial No. 387,569.

This invention relates to a new and novel means for advertising, and the principal object is to provide an apparatus in the form of a billboard that carries the advertising in removable, replaceable units that are interchangeable one with the other or with other advertising subject-matter on other units that in their various interchangeable positions are arranged to form complete panoramic views that can cover part or the entire face of the billboard. To that end I provide a billboard structure that is adapted to hold a plurality of removable interchangeable units with subject-matter arranged on their faces that at adjacent edges matches so as to form panoramic views, pictures or reading matter.

Another object is to provide an apparatus in the form of a billboard having removable box units interchangeable one with the other, each having films carrying the views, pictures and advertising arranged to match when moved or interchanged with means for intermittently moving the films so as to attract attention to the subject-matter on the billboard.

Another object of the invention is to greatly increase the usefulness of billboards as a medium of advertising by employing moving and lighting features so as to more effectively attract attention to the advertising subject-matter.

To that end I employ sheets of endless material on which the advertising matter is placed with means for intermittently moving the sheets so as to present the subject-matter in a new way as by changing the pictorial panoramic view so as to be unusually attractive and interesting and highly artistic. In other words the advertising subject matter is not necessarily changed when moved but is shown in a different color or surrounded by a new pictorial view, it being understood that the advertising can also be changed if desired.

Another object of the invention is to increase the attractiveness of billboards by combining a moving film and stationary pictures in presenting the advertising matter so as to create in the mind of the observer a great interest. To that end I employ endless films carrying the advertising matter with the films arranged in interchangeable box units so that they pass between spaced glasses with scenes such as trees, houses, clouds and the like printed on the front glasses so that when the films are intermittently moved the objects thereon, such as animals, automobiles, airplanes and the like, appear to pass back of the objects painted on the glasses and in order to add a highly artistic effect to the apparently natural scene I employ natural color on the films and also have lamps back of the rear glasses that are semi-transparent so as to soften the light into a pleasing effect. It is understood that the brilliancy of the lights can be changed to suit various subjects requiring lights of a greater or less candle-power.

An object is to provide a bill-board having a face formed of interchangeable, movable box units that can be interchanged and replaced by other similar box units to form other panoramic views with the advertising altered or changed with each box unit adapted to be prepared in a plant ready to be attached to any bill-board of any kind and interchangeable one bill-board with another.

A feature of the invention is shown in the jointed connection of the films whereby sections can be taken out and interchanged or replaced with new sections so that the new or changed sections match with other sections at adjacent edges.

Features of invention are shown in the construction, combination and arrangement of parts whereby a bill-board is provided that is of great usefulness in the art of advertising, that is highly attractive and artistic, that also is easy to construct, assemble and operate and is durable in use.

Other objects, advantages and features of invention may appear from the accompanying drawings, the subjoined detailed description and the appended claims.

The accompanying drawings illustrate the invention.

Fig. 7 is a fragmental semi-diagrammatic view of a film arranged between the front and rear glasses of a box unit detached therefrom, illustrating how pictures or advertising on the film can be moved so as to disappear behind figures or pictures painted on the front glass, and showing the film moving vertically.

Fig. 8 is a section on the line 8—8 of Fig. 7 showing the film between the glasses.

Fig. 9 is a view analogous to Fig. 7 showing the film moving horizontally so as to move the pictorial advertising scenes on the film in behind pictorial scenes on the front glass of a box unit.

Fig. 10 is a section on the line 10—10 of Fig. 9, showing the film between the glasses.

Fig. 11 is a plan view of a fragmental portion of a film showing the means of detachably connecting its sections together so that they can be removed and interchanged.

Fig. 12 is an enlarged fragmental section on the line 12—12 of Fig. 1, showing the film formed of sections and arranged to move horizontally.

Fig. 13 is an enlarged fragmental view of a portion of the film showing the clips for attaching the edges of the film sections together.

Fig. 14 is an enlarged section on the line 14—14, Fig. 13.

Fig. 15 is a front view of a bill-board having interchangeable plates on which various panoramic views can be placed in connection with the advertising that can be fixed to the plates.

Fig. 16 is a section on the line 16—16 showing the means for detachably securing the interchangeable plates to a bill-board.

Fig. 17 is a view analogous to Fig. 15 showing the plates interchanged to form different panoramic pictures and with the advertising transposed.

Fig. 18 is a perspective rear view of one of the interchangeable plates detached from the bill-board showing its rearwardly extending stud bolts by which it is detachably connected to a bill-board.

Fig. 19 is an enlarged fragmental section on the line 19—19 of Fig. 15 showing one of the stud bolts for detachably securing the plates to the bill-board.

Figure 1:
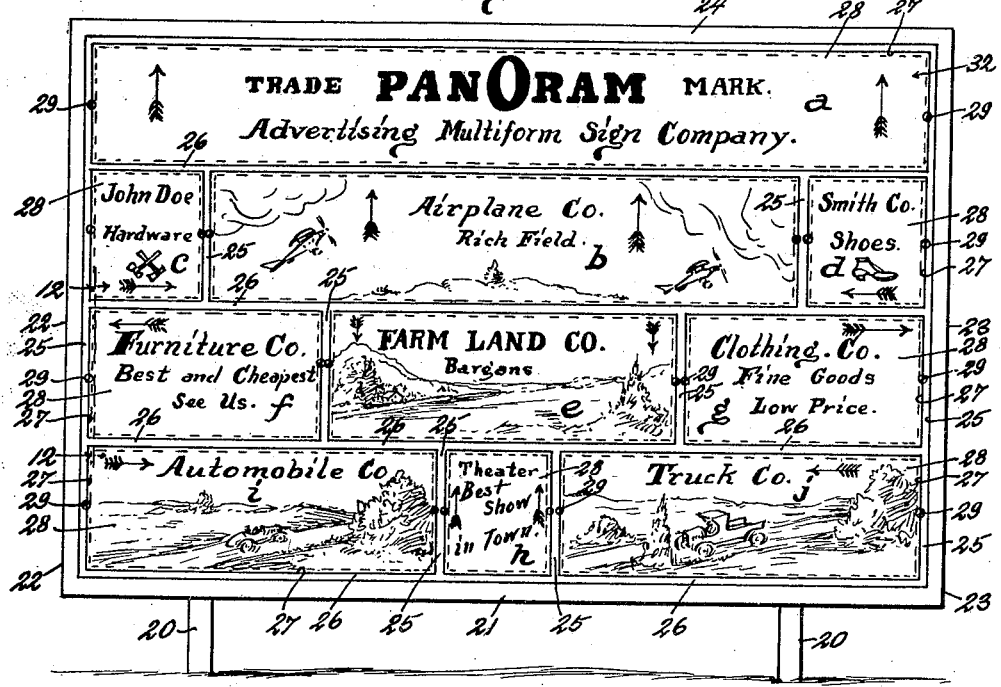
Fig. 1 is a front view of a bill-board constructed in accordance with this invention, showing the various sized box units insertible in the compartments of the bill-board and semi-diagrammatically indicating the units as removable and movable, and indicating by feathered arrows the vertical and horizontal movements of the unit films.

My improved bill-board includes the usual supports 20 on which a frame is erected that includes a floor 21, end walls 22, 23 that support the roof 24, and between the end walls I arrange vertical partitions 25 and horizontal partitions 26 that separate the space between the end walls, roof and floor into compartments 27 that can be uniform or varied as to size. In Fig. 1 I show the compartment varying in size and into these spaces I extend the box units 28 that are in the form of film boxes that carry the pictorial panoramic advertising.

Figure 5:
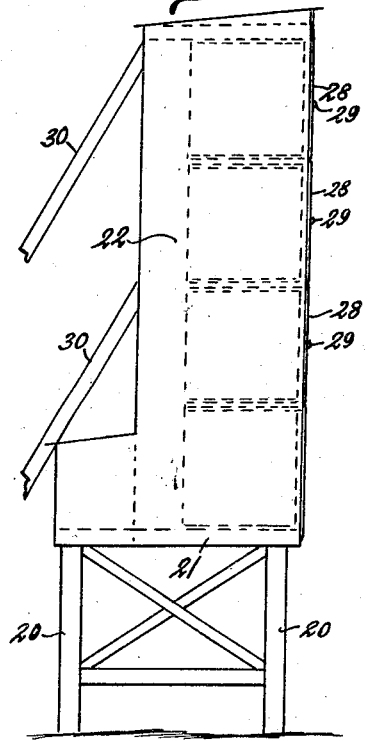
Fig. 5 is a semi-diagrammatic side view of the bill-board shown in Figs. 1 and 3.
Figure 6:
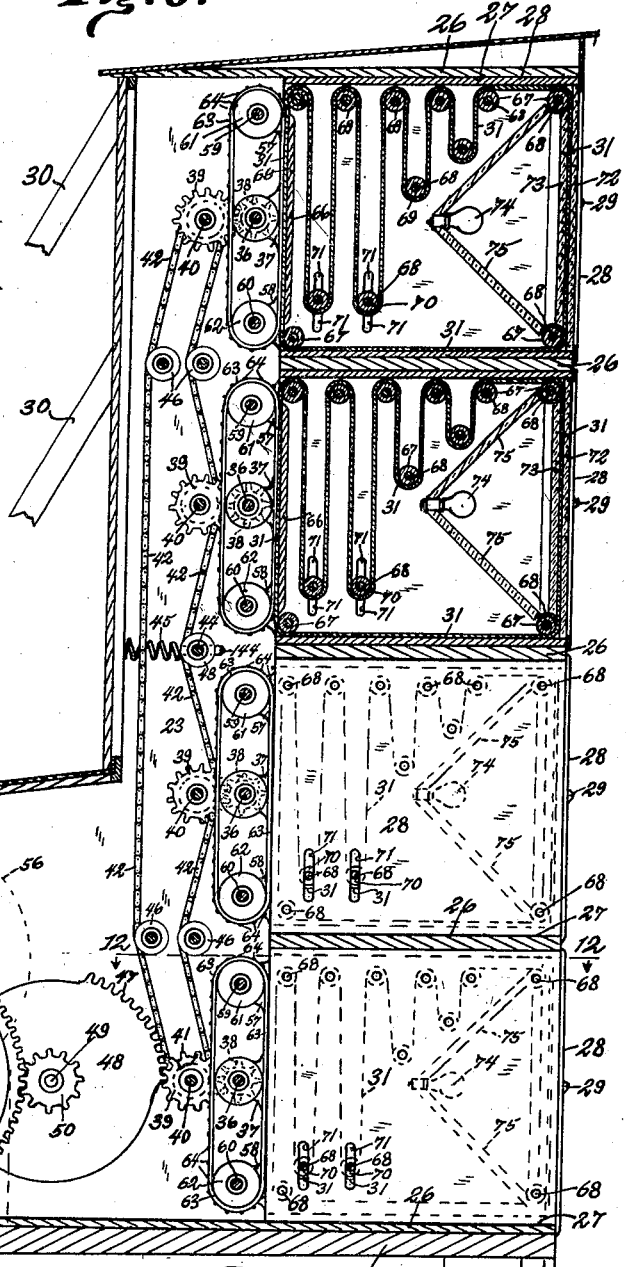
Fig. 6 is an enlarged fragmental staggered section on the line 6—6 of Fig. 3, diagrammatically showing a means for simultaneously and intermittently moving the films of the four rows of box units in a vertical direction.

The box units 28 can be detachably secured by screws 29 in the compartments, as indicated in Fig. 1, and also the bill-board can be provided with the usual wind braces 30, as indicated in Figs. 5 and 6.

The box units 28 are made to fit snugly in the various compartments so they can be easily secured in place by screws 29 or other well known fastening means so they are removable for the purposes of changing their films, interchanging one unit with another or supplying new units to the board. It is understood that only units of the same form and size are interchangeable with each other.

Figure 2:
Fig. 2 is a diagrammatic plan view of a movable film flattened out, this film being for the upper box unit shown in Fig. 1, and showing it with colored advertising sections.
Figure 3:
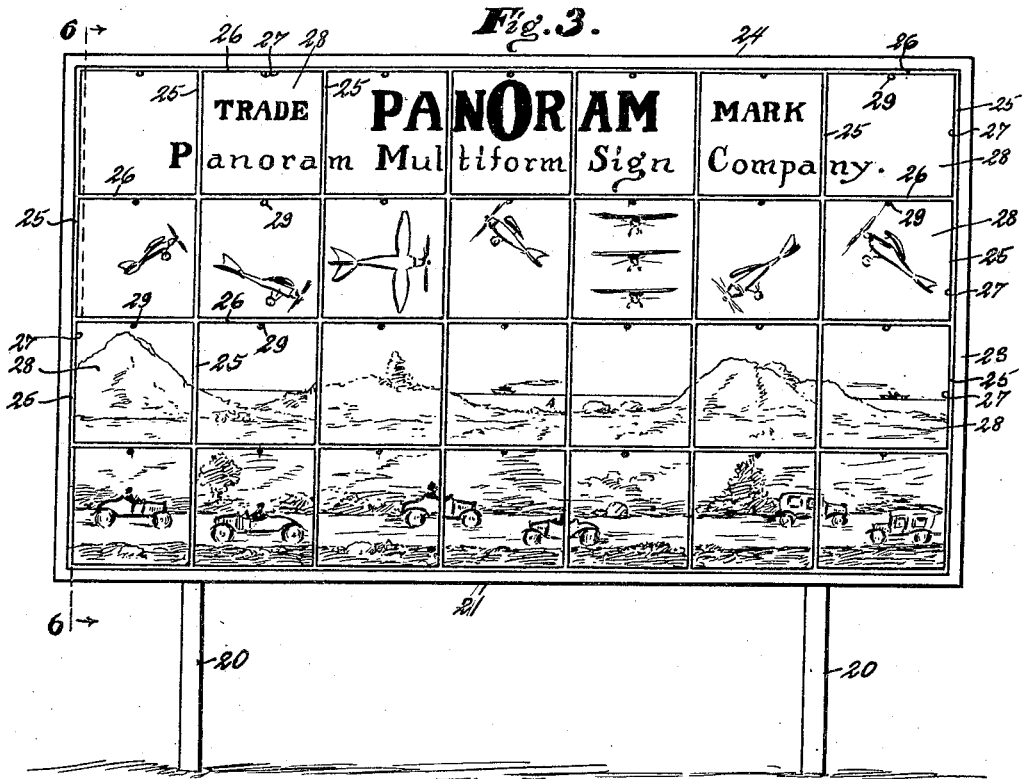
Fig. 3 is a view analogous to Fig. 1 and showing the box units all of a uniform size and having the advertising extended over a number of the upper box units, and showing a panoramic picture extended over the lower rows of box units with advertising omitted.
Figure 4:
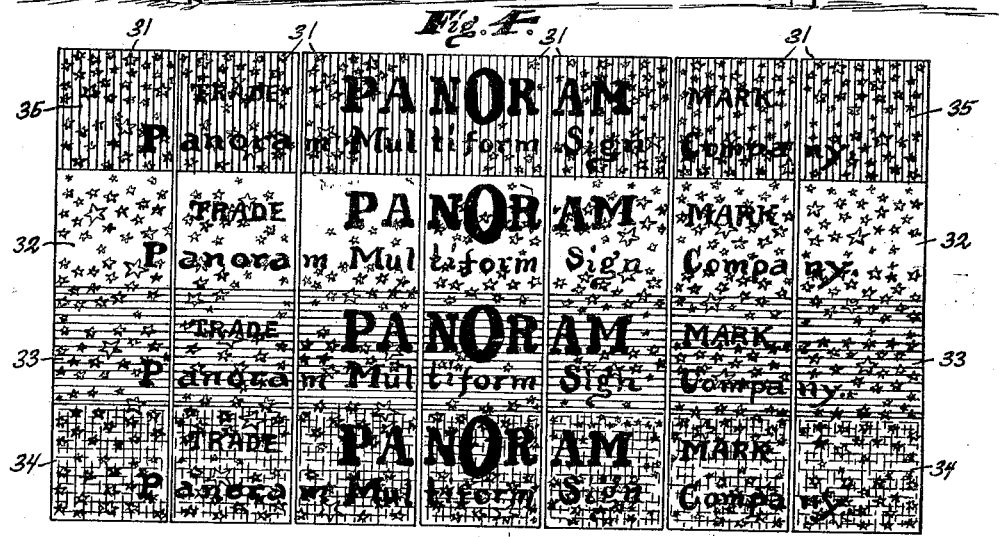
Fig. 4 is a semi-diagrammatic plan view of the films used in the upper box units of Fig. 3 showing the sections formed of different colors and decorated with stars, omitting the tooth holes at the edges of the films.

In Fig. 1 the space in the top row is filled by a single elongated box unit $a$ that carries the advertising sign Panoram and associated words that is printed in the red, white, blue and yellow spaces shown in the endless film 31, diagrammatically indicated in Fig. 2, and this long unit cannot be interchanged with its associated units, but it can be replaced by a similar box unit carrying a different advertising film.

In the second row from the top I show a center elongated box unit $b$ at the ends of which the interchangeable box units $c$ and $d$ are arranged, the center box unit $b$ not being interchangeable with any of the other boxes but can be replaced by a similar box unit.

In the third row from the top I also show a center unit $e$ on opposite sides of which are the interchangeable units $f$ and $g$; and in the bottom row I show a center box unit $h$ that is interchangeable with the units $c$ and $d$; and the end box units $i$ and $j$ that are interchangeable with each other and also with the center box e. It is obvious that all the box units in the bill board can be replaced with other units of the same size having films carrying other advertising subject-matter, or the same subject matter presented with new panoramic pictures in other colors.

I provide means for intermittently moving the films 31 so as to show the same advertising in a different color, or associated with a different panoramic view or to show the subject matter in a different way or also to show entirely new advertising, and in moving the films they can all be actuated at substantially the same time and all moved in the same direction if desired, but preferably the films in some instances are moved in different directions as indicated by the feathered arrows in Fig. 1. As seen therein the films of the box units a, b and h are arranged to be moved upwardly, the film of the box unit e is arranged to be moved downwardly, the films of box units c, d, i and j are arranged to be moved horizontally and toward the center of the board, and the films of the box units f and g are arranged to be moved toward the ends of the board so that when the films are intermittently actuated they move in the various directions in an apparently confusing manner that is mystifying and attractive.

The films are moved in a systematic order and at a predetermined distance so that when they are stopped the advertising of each is centralized over the front end of each unit and over the face of the bill-board.

I provide means for intermittently moving the films a one-fourth step each time the mechanism is actuated, so that when stopped they are in the right position to display the pictorial advertising. The film 31 shown in Fig. 2 is provided with four sections colored, red, white, blue and yellow, which will be successively moved over the front end of the box unit a.

The white strip 32 of the film is shown on the front of the box unit a, and if moved a one-fourth step in the direction of the feathered arrows the blue strip 33 will be next to show, followed intermittently by the yellow and red strips 34, 35.

It is understood that I may extend the film so as to include many colors in the advertising if desired. The mechanism for moving the films a one-fourth step intermittently is old and well understood in the art, and for that reason is not shown in detail, except that in Fig. 6 I show a common means for simultaneously moving the films of all the box units in a vertical direction.

Each box unit is provided with a shaft 36 secured in end bearing 37, and these shafts carry spur gears 38 that are arranged to mesh with driving gears 39 on shafts 40 that extend from end to end of the bill-board.

Each shaft 40 carries a sprocket wheel 41 over which an endless chain 42 is extended that is held taut by the center guide pulley 43 mounted on shaft 44 that has its ends extending into slotted bearings 144 and under the tension of end springs 45, only one of which is shown in the drawing; also the chain is arranged to extend over other guide pulleys 46 adjacent the top and bottom of the bill board.

Also arranged to mesh with the teeth of one of the lower gears 39 are the teeth 47 of a mutilated gear 48 on the shaft 49. The shaft 49 carries a speed reduction gear 50 that in turn meshes with the teeth of another mutilated gear 51 on the shaft 52. This shaft also carries a large gear 53 that meshes with the teeth of a speed reduction gear 54 on the shaft 55 of a motor 56, as indicated by dotted lines in Fig. 6. Many of the parts of this drive are shown diagrammatically as intermittent drives are old and well understood in the art, it being understood that the ratio of the drive is such as to advance the films a one-fourth step each time the shafts 36 are actuated.

Each unit is provided with end bearings 57, 58 that support the end shafts 59, 60 on which the end drums 61 and 62 are mounted. Belts 63 are extended over these drums and provided with teeth 64 that are adapted to register with and extend into the spaced tooth holes 65 at opposite edges of the films 31 so that when driven the belts move the films. I arrange guide plates 66 at the rear of the units to hold the films so that the teeth of the belts properly engage the tooth holes.

The films 31 preferably are elongated, as shown in Fig. 6, and extend over the supporting rollers 67 rotatably mounted on the cross rods 68 secured to the side walls of the box units. The rollers are arranged so they hold the films flush with the front and rear ends of the units.

I provide a number of intermediate rollers 69 over which the film is extended, and also two weighted rollers 70 that have their bearing rods 68 loosely mounted in slots 71 in the ends of the units so that their weights hold the films taut.

At the front of the box units I provide spaced glass guides 72, 73 between which the films are arranged to slide when actuated and preferably the front glasses 72 are transparent, so that the advertising from the front of the bill board is clearly visible.

Preferably the rear glasses 73 are semi-transparent so that the lights from the lamps 74 are diffused and softened.

The lamps 74 are arranged some distance back of the glasses 73 and are provided with reflectors 75 that preferably are glass mirrors. The means for lighting the lamps is old in the art and therefore is not described in the specification or shown in the drawings.

If desired the front glasses 72 of the film guides can have objects such as trees, clouds or pictorial scenes painted on their front sides so that when the films are moved the pictorial advertising matter thereon will pass under the objects on the glasses. This feature of the invention is illustrated in Figs. 7 to 10 inclusive.

In Fig. 7 I show a cloud 76 painted on the glass 72 so that when the film 31 is moved in the direction of the arrows the airplanes 176 on the film will be moved upward and disappear under the cloud. In Fig. 9 I show a panoramic scene on a film with an automobile 77 on a road which when moved in the direction of the arrow will disappear behind the tree 78 painted on the glass 72.

In Figs. 11, 13 and 14 I show a film made of sections that are connected together by clips 79 so that one or more sections of a film can be taken out and replaced with other sections that match at adjacent edges relative to pictorial matter. In order to simplify the matching of the edges of the film sections I provide symbols 80 and 81, the former indicating an all-land scene at the matching edges and the latter water and land scenes at the matching edges.

In Fig. 12 which is a section on line 12—12, Fig. 1, I show the film 31 and its driving mechanism arranged to move the film horizontally instead of vertically, as shown in Fig. 6, in which instance the shafts 59 are arranged vertically instead of horizontally, and the driving connection between these shafts and the motor rearranged accordingly.

In Figs. 15 to 19 inclusive I show the films 31 fixed to the front ends of the plates 128 with the latter interchangeable as to their position on the bill-board. The bill-board is provided with a back plate 83 in which there are spaced bolt holes 84 to receive the stud bolts 85 that are secured to the back of the plates 128, as best shown in Figs. 16, 18 and 19. The bolt holes and bolts are spaced so that the plates 128 are interchangeable with each other or can be replaced by similar sized plates.

In Fig. 15 I show the bill-board with the plates provided with pictures, each complete in itself, arranged to match at adjacent edges so as to form complete panoramic pictures extending entirely across the bill-board and each plate advertises a separate recreation resort, as indicated by the various names which are used only for the purpose of illustration.

The illustration in Fig. 17 is substantially the same as that shown in Fig. 15 except that I have changed the position of the plates to form different panoramic views associated with the same advertising. In other words in the top row I have moved the plate advertising the "Breakers" from the upper right to the upper left hand corner of the bill-board, and moved the other plates advertising "Cove Point," "Forest Inn" and "Signal Hill" one step to the right. In the bottom row I have moved "Sunset Cliff" from the lower left hand corner of the bill-board to the lower right hand corner and "Lookout" I have moved from the lower left hand corner to the lower right hand corner and "Cliff by the Sea" I have moved from the right center into left center, and "Sunrise Point" from left to right center, so that in both rows I form entirely new panoramic scenes. It is obvious that these plates 128 can be interchanged to form many such views.

The use and operation of this improved bill-board have been very fully described in the specification. The inventive features disclosed in the means for moving the films will be made the subject-matter of a separate application for U. S. Letters Patent.

I claim as my invention:

1. A bill-board including a vertically arranged frame, a plurality of interchangeable box units adapted to be placed adjacent each other and detachably secured in said frame so their pictorial sides are aligned with the front surface of said frame, and having panoramic pictorial advertising thereon formed to match at adjacent edges when arranged on the bill-board and interchangeable in position relative to each other.

2. A bill-board including a vertically arranged open faced frame, a back plate thereto, a plurality of interchangeable box units adapted to be placed adjacent each other and detachably secured to said back plate so their pictorial sides are aligned with the face of said frame and having panoramic pictorial advertising thereon formed to match at adjacent side edges when arranged on the bill-board or interchanged in position relative to each other, said pictorial advertising having near its side edges similarly arranged pictorial features that match when so interchanged.

3. A bill-board including a vertically arranged open faced frame, a back plate thereto, a plurality of interchangeable box units adapted to be placed together edge to edge with their pictorial sides and aligned with the front surface of said frame and having panoramic pictorial advertising thereon formed to match at adjacent side edges, means for detachably securing said units to said back plate so they are interchangeable with one another or with similar units, said units each having near its matching side edges the representation of land, water, sky, roads and other pictorial features of similar width so that the pictures will match when so interchanged.

4. A bill-board including a vertically arranged frame having an open front, a plurality of interchangeable box units adapted to be placed adjacent each other so their front sides are aligned with the open front surface of said frame and extending entirely over it and having pictorial advertising thereon formed to match at adjacent side edges so as to form panoramic views and having symbols near the matching edges of the pictures indicating which edges of the pictures may be matched by bringing together edges of pictures having like symbols and means for intermittently moving the pictorial advertising to present an entirely different panoramic view.

5. A bill-board including a frame having a number of compartments therein, a plurality of interchangeable box units having front and rear ends adapted to be secured in said compartments so the front ends are aligned with the face of said bill-board, rollers at the front and rear ends of said units, films carried by said rollers that are arranged to extend over the front and rear ends thereof and having pictorial advertising therein, weighted intermediate rollers arranged between said front and rear rollers for holding said films taut, means for intermittently moving said film so as to pass the advertising thereon over the faces of said units, and lamps for illuminating said films.

6. A bill-board including a frame having a number of compartments therein, a plurality of interchangeable box units having front and rear ends and adapted to be detachably secured in said compartments so the front ends of said units are aligned with the face of said bill-board, films carried by said units that are arranged to extend over the front and rear ends of said units and having pictorial advertising thereon, means adjacent the ends of said units for intermittently moving said films, transparent guides at the front of said units between which said films are extended so that movable pictorial advertising is visible over the entire front of the bill-board, and lamps adjacent said guides for the purpose specified.

7. A bill-board including a frame having an open front and a number of compartments therein, a plurality of interchangeable box units having front and rear ends and adapted to be detachably secured in said compartments so that front ends of said box units are aligned with the face of said bill-board so the rear ends engage a common driving means, endless pictorial advertising films carried by said units that are arranged to extend over the front and rear ends of said units, end rollers on which said films are supported, intermediate suspended weighted rollers for holding said films taut over the end rollers, and means adjacent the rear ends of said units for intermittently moving said films for the purpose specified.

8. A bill-board including a frame having an open front and a number of rows of rectangular compartments therein, a plurality of interchangeable box units detachably secured in said compartments so their front ends are aligned with the face of said bill-board, endless pictorial advertising films, rollers in said box units for supporting said films, spaced glass guides at the front of said units between which said films are extended so that movable pictorial advertising is visible over the entire front of the bill-board, and means for intermittently moving said films for the purpose specified.

9. A bill-board including a frame having an open front and a number of rows of rectangular compartments open at their front and rear ends, a plurality of interchangeable box units detachably secured in said compartments so they engage a common driving means, end rollers carried by said units, endless films supported on said guide rollers, spaced glass guides at the front of each of said units between which the films of each unit is extended and adapted to be moved, intermediate weighted rollers for holding said films taut on said end rollers, a common driving means adjacent the rear ends of said box units for intermittently moving said films, and means for illuminating said films as they pass between their respective guides.

10. A bill-board including a vertical frame having an open face and a number of rows of rectangular compartments open at their front and rear ends, a plurality of rectangular interchangeable box units detachably secured in said compartments so their front ends are aligned with the open face of said bill-board, rollers carried by said units, endless sectional films supported on said rollers that have pictorial advertising thereon with adjacent edges matched to form unbroken panoramic views, spaced glass guides at the front ends of said units between which the respective film of each unit is extended and adapted to be moved, said outermost guides having objects painted thereon so that as the films are moved their pictorial advertising passes behind the objects painted on said guide, and a common driving means adjacent the rear ends of said units for intermittently moving their films for the purpose specified.

11. A bill-board including a vertical frame having an open face a number of rows of rectangular compartments open at their front and rear ends, a plurality of rectangular interchangeable box units insertible in said compartments from their front ends so they are aligned vertically with the open face of said frame, screws for detachably holding said box units in said compartments, spaced glass guides at the front ends of said units, rollers carried by said units, endless pictorial advertising films carried by said rollers that are extended between their respective guides and have adjacent edges matched to form unbroken panoramic views, means within said box units for holding said films taut, and a common driving means adjacent the rear ends of said box units for intermittently moving their films for the purpose specified.

In witness whereof, I have hereunto affixed my signature.

GUSTAVUS W. ESCHENBACH.